Patented Nov. 30, 1943

2,335,365

UNITED STATES PATENT OFFICE 2,335,365

PRODUCTION OF CHROMIUM TRIOXIDE

Carleton N. Smith, Snyder, N. Y., assignor to Carbide and Carbon Chemicals Corporation, a corporation of New York No Drawing. Application August 14, 1941,
Serial No. 406,810

7 Claims. (Cl. 23—145)

The invention relates to the production of chromium trioxide, or chromic anhydride, and is particularly concerned with an improved process for preparing this compound in an exceptionally pure form.

In accordance with prior practice the most common manner of preparing chromium trioxide is by the reaction of a metal chromate or bichromate, in particular the sodium and potassium salts, with sulfuric acid. This forms a sulfate of the metal and the product desired, the two compounds then being separated by any suitable means. Numerous procedural modifications in applying this reaction have been proposed in the art, including the use as starting compounds of chromates of metals whose sulfate salts are insoluble and can be removed from the reaction mass by precipitation. Difficulty still persists, however, in making a sufficiently clean and complete separation of the reaction materials to provide a highly pure product, and consequently chromium trioxide of the most pure grade, showing an analysis of 99.8% $CrO_3$ or better, remains an expensive chemical compound, uneconomical for many industrial uses.

It is an object of this invention to provide a means for preparing very pure chromium trioxide in a less complicated and expensive manner, and in particular to provide an improved way for purifying this product, through a more ready, complete and clean separation and recovery of the chromium trioxide from other reaction compounds and impurities.

In accordance with the invention the aforesaid general type of reaction is employed using as a starting compound a chromate or bichromate of a metal whose sulfate salt is substantially insoluble in any of the reaction materials. The alkaline earth metal chromates, and lead chromate will comply with required conditions, and in contact with sulfuric acid will form chromium trioxide in accordance with the reaction

$$MCrO_4 + H_2SO_4 \rightarrow MSO_4 + CrO_3 + H_2O$$

The initial reaction is conducted in aqueous solution at normal temperatures, or at least without the addition of external heat, and the insoluble metal sulfate which precipitates is removed in substantial part by filtration. From the remaining solution crude chromium trioxide is recovered by evaporation or crystallization. This impure product is then subjected to a temperature in the neighborhood of 200° C., sufficient to fuse the chromium trioxide, which is filtered while molten, and thus separated from the residual solid reaction products.

The following examples are further illustrative of the process proposed by the invention.

*Example 1.*—Calcium chromate monohydrate, in an amount of 253.8 grams, was suspended in one liter of water, and treated with 150.3 grams of 95.75% sulfuric acid. The slurry was agitated until the reaction was complete. The precipitated calcium sulfate was then filtered off, and the solution evaporated to dryness. After further drying of the chromium trioxide at 110° C., the crude product analyzed 94.51% $CrO_3$. This impure material was then fused, and filtered through a fritted glass filter by suction, maintaining a temperature on the melt and filtering equipment of 205° C. The residual calcium sulfate and other solid impurities were thus removed, and the purified product analyzed 99.93% $CrO_3$.

*Example 2.*—Impure chromium trioxide, prepared as described in the first step of Example 1, and containing approximately 10% of calcium sulfate, was fused in an iron pot and transferred to a pressure filter that had been preheated to about 200° C. With an 80 pound air pressure the melt was filtered through a supported "Fiberglas" cloth filter. Samples of the purified chromium trioxide, taken at intervals during the filtration, showed an analysis of: $CrO_3$—99.84 to 99.97%; $Cr_2O_3$—0.015 to 0.06; $H_2O$ (as picked up from air)—0 to 0.14.

In applying the process commercially, modifications in the procedure described in the examples may be desirable, and are contemplated to suit various conditions. As previously mentioned chromates and bichromates of metals other than calcium are appropriate in the reaction, provided their sulfate salts are insoluble in molten chromium trioxide. Substantially stoichiometric amounts of sulfuric acid are preferred in the reaction, although under some circumstances an excess of acid, or even slightly less than stoichiometric quantities may be found suitable. As an alternative in the first step of the process the chromate can be treated with successive portions of sulfuric acid in the same solution, and the insoluble sulfate filtered off between additions. In this manner solutions of chromium trioxide of as high as 35% can be obtained, before evaporating to recover the crude product, which may add to the economy of the process.

Temperatures employed should at no time substantially exceed the melting point of the impure chromium trioxide, varying from about 195° C. to 220° C., and by comparatively rapid filtering after fusion, no appreciable loss of the product by decomposition is encountered. The equipment used, particularly in filtering the molten impure product, is not significant to the invention, and vacuum, pressure, or centrifugal filtration, through filtering media such as glass wool, glass cloth, metal cloth, or asbestos, may be found suitable.

The above and other modifications in the process are intended to be included within the invention.

I claim:

1. Process for making pure chromium trioxide which comprises reacting a chromate of an insoluble sulfate forming metal with sulfuric acid in aqueous solution, to form chromium trioxide and solid precipitated metal sulfate, removing by filtration a substantial part of the precipitated metal sulfate, evaporating the remaining solution to recover crude chromium trioxide, heating said crude chromium trioxide to a temperature of about 195° C. to 220° C. to melt the trioxide, and filtering the molten chromium trioxide to remove the residual solid reaction products.

2. Process for making pure chromium trioxide which comprises reacting a chromate of an alkaline earth metal with sulfuric acid in aqueous solution, to form chromium trioxide and a solid precipitated sulfate of the alkaline earth metal, removing a substantial portion of the precipitated metal sulfate, heating the remaining impure chromium trioxide to a temperature of about 195° C. to 220° C. to melt the trioxide, and filtering the molten chromium trioxide to remove the residual solid reaction products.

3. Process for making pure chromium trioxide which comprises reacting a chromate of an alkaline earth metal with substantially stoichiometric amounts of sulfuric acid in aqueous solution, to form chromium trioxide and solid precipitated sulfate of the alkaline earth metal, removing a substantial part of the precipitated metal sulfate, evaporating the remaining solution to recover crude chromium trioxide, heating said crude chromium trioxide to a temperature of about 195° C. to 220° C. to melt the trioxide, and filtering the molten chromium trioxide to remove the residual solid reaction products.

4. Process for making pure chromium trioxide which comprises reacting calcium chromate with substantially stoichiometric amounts of sulfuric acid in aqueous solution, to form chromium trioxide and solid precipitated calcium sulfate, removing a substantial part of the calcium sulfate by filtration, evaporating the remaining solution to recover chromium trioxide in crude form, heating the impure chromium trioxide to a temperature of about 195° C. to 220° C. to melt the trioxide, and filtering the molten chromium trioxide to remove the residual solid reaction products.

5. In a process for making chromium trioxide by the reaction of sulfuric acid and a chromate of an insoluble sulfate forming metal, the steps of purifying the crude chromium trioxide so formed, which comprises heating the impure chromium trioxide to a temperature of about 195° C. to 220° C. to fuse the trioxide, and cleanly separating the fused chromium trioxide from the residual solid reaction products by filtration.

6. In a process for making chromium trioxide by the reaction of sulfuric acid with a chromate of an alkaline earth metal, the steps of purifying the crude chromium trioxide so formed, which comprises fusing the impure chromium trioxide by heating to a temperature of about 195° C. to 220° C., and filtering the fused chromium trioxide to cleanly separate it from the residual solid reaction products.

7. In a process for making chromium trioxide by the reaction of sulfuric acid with calcium chromate, the steps of purifying the crude chromium trioxide so formed, which comprises fusing the impure chromium trioxide by heating to a temperature of 195° C. to 220° C., and filtering the fused chromium trioxide to cleanly separate it from the residual solid reaction products.

CARLETON N. SMITH.